United States Patent [19]
Asano et al.

[11] Patent Number: 5,378,140
[45] Date of Patent: Jan. 3, 1995

[54] MOLD CLAMPING APPARATUS

[75] Inventors: Kazuo Asano; Toshihiro Takai, both of Nagoya, Japan

[73] Assignee: Tsukishima Kikai Co., Ltd., Tokyo, Japan

[21] Appl. No.: 103,140

[22] Filed: Aug. 9, 1993

[30] Foreign Application Priority Data

Aug. 27, 1992 [JP] Japan .................. 4-252304

[51] Int. Cl.$^6$ ............................................. B29C 33/22
[52] U.S. Cl. .................... 425/451.2; 100/264; 100/290; 425/451.7; 425/451.9
[58] Field of Search ............... 425/450.1, 451.2, 451.7, 425/451.9, 589, 590, 595; 100/264, 273, 289, 290

[56] References Cited

U.S. PATENT DOCUMENTS

| 3,512,476 | 5/1970 | Georg | 100/264 |
| 4,011,810 | 3/1977 | Santic | 100/290 |
| 4,702,688 | 10/1987 | Schenk | 425/450.1 |

FOREIGN PATENT DOCUMENTS

| 0381770 | 8/1990 | European Pat. Off. . |
| 429373 | 9/1911 | France . |
| 8707979 | 9/1987 | Germany . |
| 1416129 | 12/1975 | United Kingdom . |

Primary Examiner—James P. Mackey

[57] ABSTRACT

An apparatus for moving upper and lower molds toward and apart from each other and giving additionally increased clamping force to the engaged molds. The apparatus includes a pair of reversible small power prime movers, a plurality of screw rod pairs, each of which consists of a first screw rod having an unthreaded extension and a hollow second screw rod embracing the unthreaded extension therein so as to freely rotate relative to the first screw rod, a pair of transmission mechanisms for transmitting rotary forces from the pair of prime movers respectively to the first screw rods and to the hollow second screw rods, a plurality of nut member pairs, each of which consists of a first nut member and a second nut member respectively threadedly engaged with the first and second screw rods so as to move up or down when the screw rods are rotated in one or other direction therealong, first and second molds respectively connected to the first and second nut members so as to move toward or apart with each other, and a piston device for giving additionally increased mold clamping force to the engaged two molds when the prime movers are stopped.

6 Claims, 11 Drawing Sheets

MOLD CLAMPING APPARATUS

FIELD OF THE INVENTION

The invention relates to an apparatus for moving upper and lower molds toward and apart from each other and giving additionally increased clamping force to the engaged molds.

BACKGROUND OF THE INVENTION

The most typical apparatus for mold clamping comprises a lower table and an upper table respectively having molds mounted thereon and thereunder, four guide posts for guiding the two tables to stably move up or down therealong, and lower and upper hydraulic piston-cylinder devices so that when the molds are contacted the piston-cylinder devices are actuated to give additionally increased clamping forces thereto.

However, such piston-cylinder device must be of a few to several tons of power in general and since the machine casing parts must endure such high power, they must be made of a material having high tenacity and rigidity. Forthermore, it takes so much time in order to complete one cycle of operation inclusive of finally exerting additionally increased clamping force.

SUMMARY OF THE INVENTION

An object of the invention is, thus, to provide an apparatus for mold clamping in which said defects may be avoided and overcome.

This object can be attained fundamentally by using a plurality of screw rod pairs, each comprising a first ball screw rod having an unthreaded extension and a hollow second ball screw rod embracing the unthreaded extension, which are respectively threadedly engaged with first and second nut members so as to move up or down therealong when screw rods are rotated. When a first and second table each carrying a mold is fixed to the nut members, the molds can move toward or apart from each other.

In order to rotate such upper and lower ball screw rods, it is possible to use a pair of relatively small power prime movers, e.g. servomotors.

It is preferable to use a piston-cylinder device in order to exert additionally increased clamping force, which may shorten one cycle time but necessitates a particular force transmission system, which is one of the particular features of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED EXPLANATION OF THE PREFERRED EMBODIMENT

Figure 1:
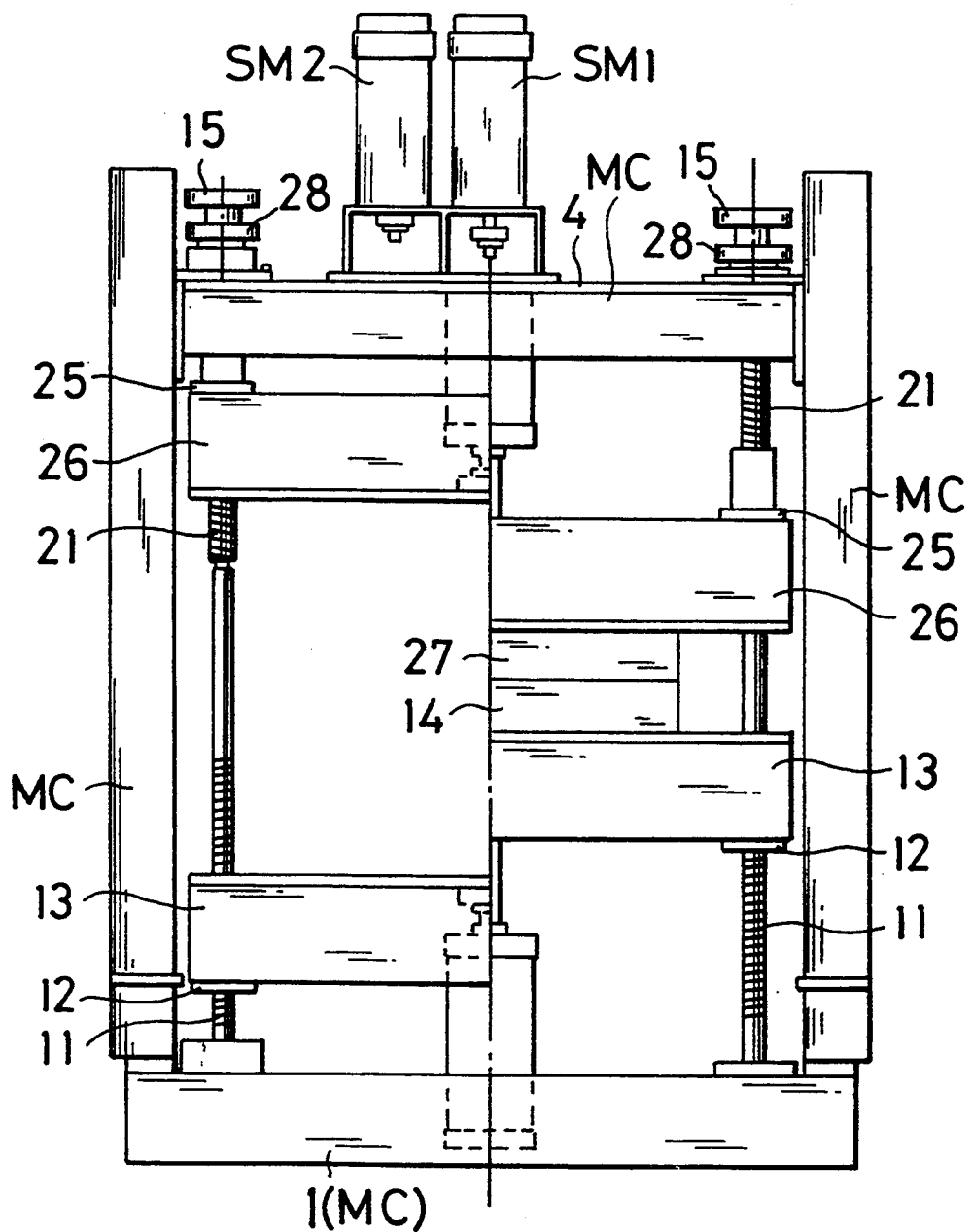
FIG. 1 is a side elevation of a preferred embodiment of the mold clamping apparatus according to the invention, in which a lower mold and table mounted therewith as well as an upper mold and table mounted therewith are shown in engaged state in the right half, while in the left half they are shown in a disengaged state.
Figure 2:
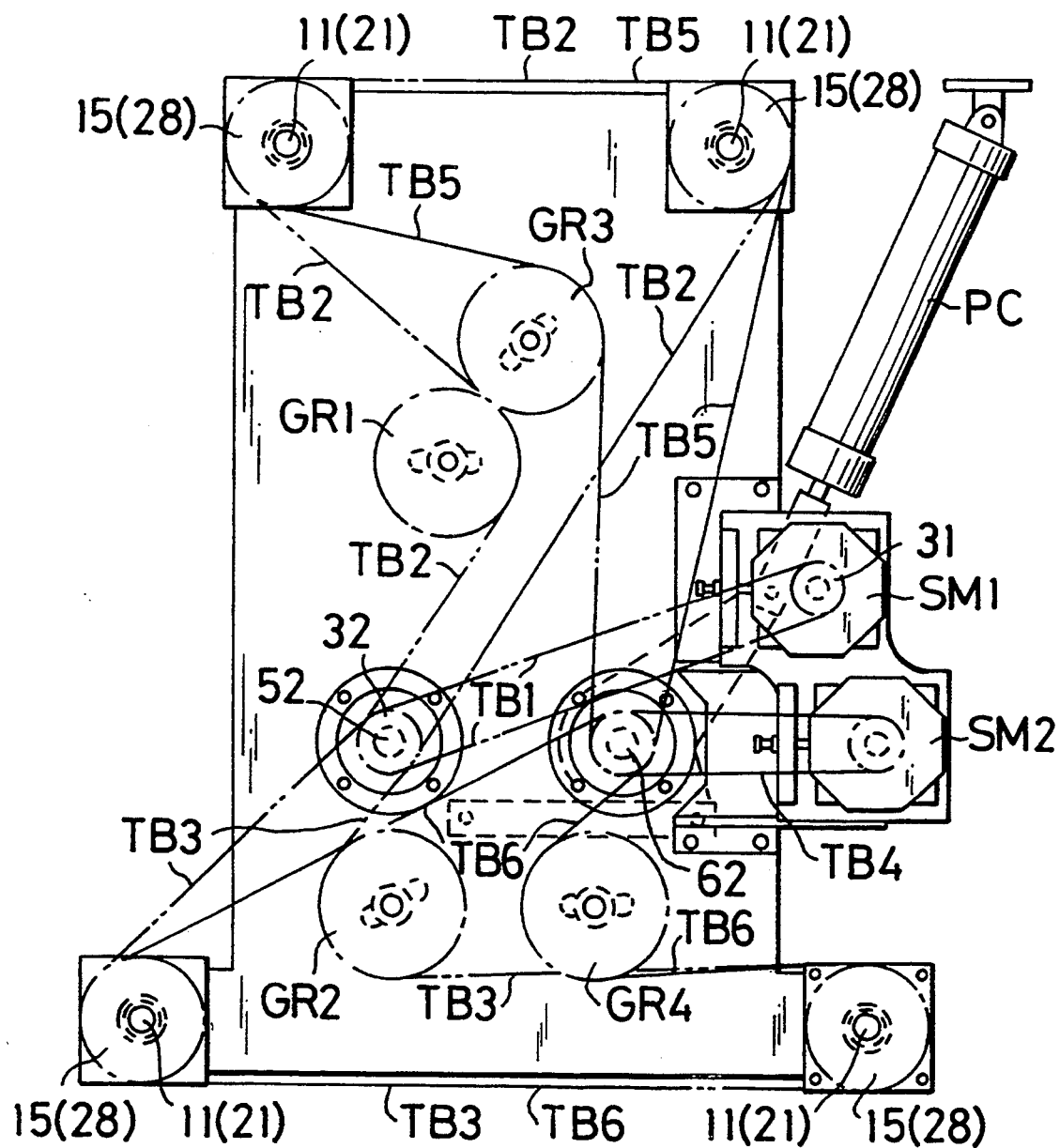
FIG. 2 is a plan view of the above.
Figure 3:
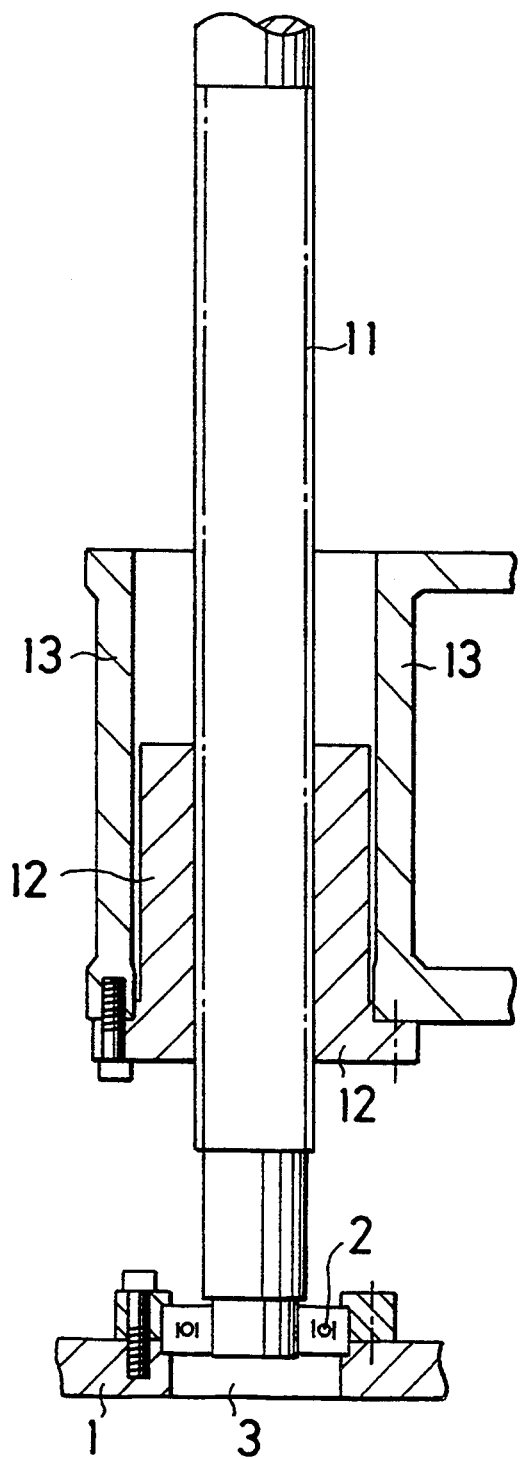
FIG. 3 is an enlarged side elevation partly in section of a lower first ball screw rod.

In reference to FIG. 1, a base bed 1 as a part of the machine casing MC supports four first ball screw rods 11 (arranged at four corners of the machine casing MC, see FIG. 2). In reference to FIG. 3, each of the ball screw rods 11 is supported at the lower end by a bearing 2 for rotation, which is mounted around the periphery of a groove 3 formed in the base bed 1.

There is threadedly mounted a nut member 12 on the ball screw rod 11 (balls arranged therebetween not illustrated) so as to move up or down therealong, when the screw rod 11 is rotated by means of a first reversible servomotor SM1 (see FIG. 1). This is applied also to the other three rods 11. A first table 13 is fixed to the four nut members 12 so that a lower or first mold 14 may be removably or exchangeably mounted thereon.

Figure 4:
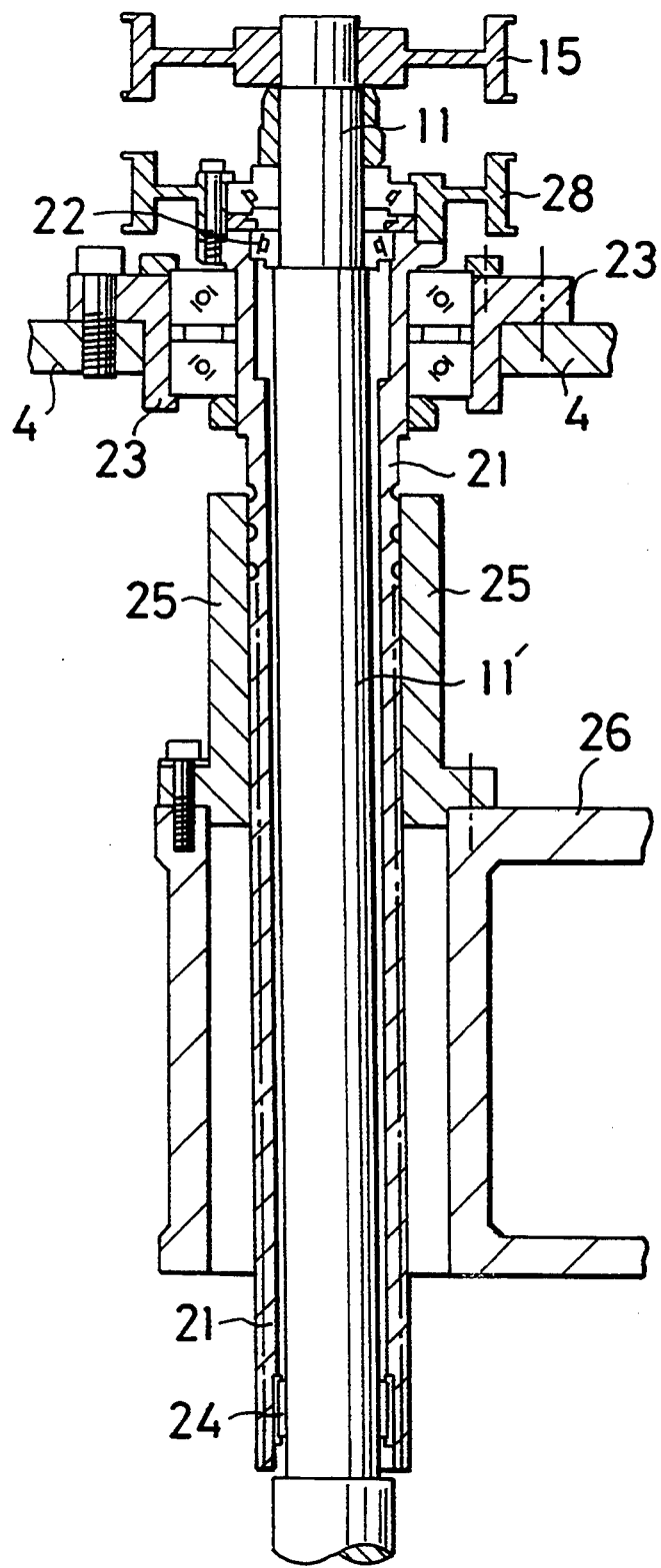
FIG. 4 is a similar view of an upper and hollow second ball screw rod embracing an unthreaded extension of the lower screw rod so that they may relatively rotate with each other.

Now in reference to FIG. 4, a hollow second screw rod 21 is supported by an upper tapered bearing 22, which is fixed to a crown member 4 as a part of the machine casing MC via a flanged ring 23, and embraces an unthreaded extension 11' of the first screw rod 11 so as to relatively rotate with each other. A needle bearing 24 is preferably arranged at the lower end of the second screw rod 21 between the inner peripheral surface thereof and the outer peripheral surface of the first screw rod extension 11'.

A second nut member 25 is threadedly engaged with the second screw rod 21 so as to move up or down when the rod 21 is rotated in one or other direction by means of a second reversible servomotor SM2. This is applied also to the other three screw rods 21. A second table 26 is fixed to the four nut members 25 so that a second or upper mold 27 may be removably or exchangeably mounted thereunder.

Figure 5:
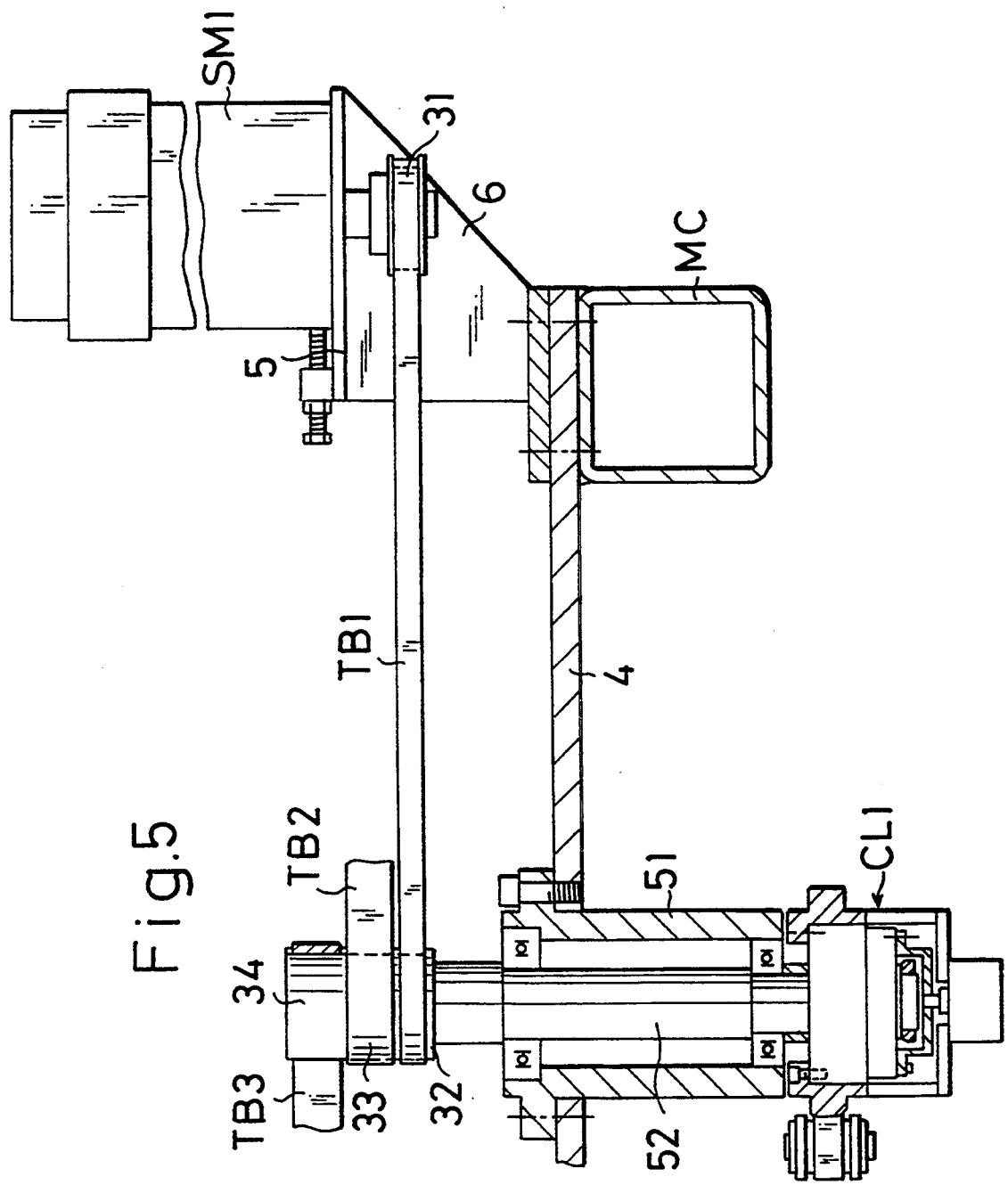
FIG. 5 is a front elevation of a first servomotor and a cylindrical casing having a rod for rotation therein as the transmission mechanism is shown partly cut off and partly in section.

It is noted here that the thread cutting direction of the second screw rod 21 is made opposite to that of the first screw rod 11 so that when the upper mold 27 is lowered by rotation of the former screw rod then lower mold 14 may be raised by rotation of the latter to be appreciated when the force transmitting mechanism is explained later in reference to FIG. 5 and FIG. 6.

The unthreaded extension 11' of the first screw rod 11 is provided at the upper end with a first belt pulley 15 and the second screw rod 21 is provided with a second belt pulley 28 thereunder in concentricity therewith for the purpose of drivingly rotating them.

It is noted here that the pulleys 15, 28 of the two screw rods 11 (21), 11 (21) shown above in FIG. 2 are arranged at a level a little higher than those shown below as seen from comparing the left pulleys 15, 28 with those shown at the right, by reason to be made clear when explaining FIGS. 5 and 6.

The reversible servomotors SM1 (FIG. 5) and SM2 (FIG. 6), which are numerically controlled by a computer (not shown), are respectively mounted on a plate 5 which is fixed to the crown member 4 so as to protrude the respective motor shafts downward, on which belt pulleys 31 and 41 are respectively mounted.

There are provided a first and second cylindrical transmission casings 51 (FIG. 5) and 61 (FIG. 6), each of which has a rod 52 and 62 respectively for rotating therein. The rotatory rods 52, 62 are respectively connected at the lower end with free wheeling clutches CL1 and CL2 for the purpose to be explained later.

The rod 52 is mounted at the upper portion protruded out of the casing 51 with a pulley 32 at a level same with the pulley 31 on the motor shaft so that a timing belt TB1 is extended therearound for rotating the rod 52 in either direction by the reversible motor SM1.

The rotating rod 52 is provided with a further pulley 33 above the pulley 32 so that a timing belt TB2 is extended around the pulley 33 and the upper pulleys 15, 15 of the two screw rods 11, 11 shown above in FIG. 2 via a guide roller GR1 so as to drive these two screw rods 11, 11 for rotation.

The rotating rod 52 is provided with a still further pulley 34 above the pulley 33 so that a timing belt TB3 is extended around the pulley 34 and the upper two pulleys 15, 15 mounted at a level higher than the above two pulleys on the first screw rods 11, 11 shown below in FIG. 2 via a guide roller GR2 so as to drive these two screw rods 11, 11 for rotation.

Figure 6:
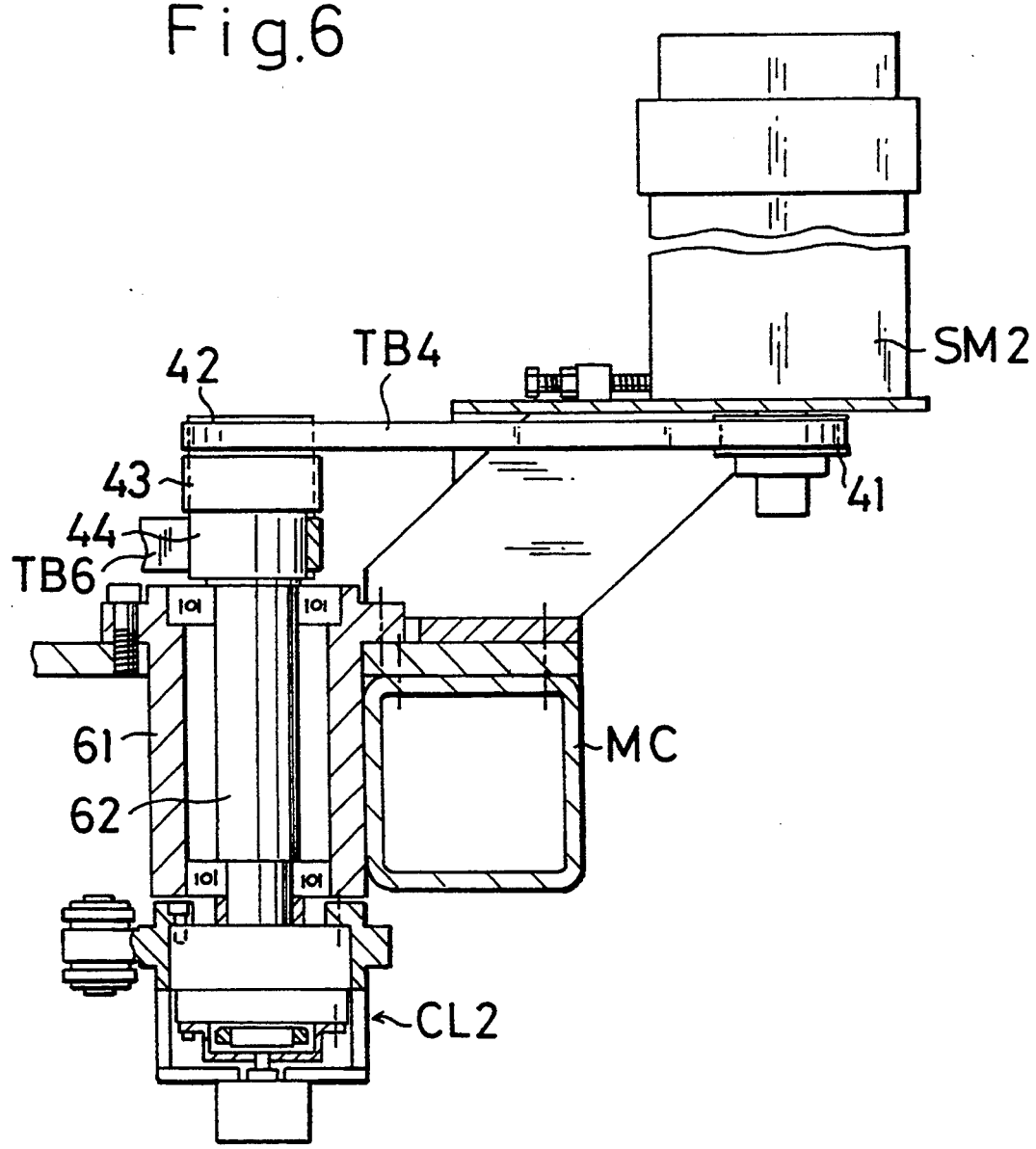
FIG. 6 is a similar view of a second servomotor and the corresponding transmission mechanism.

Now in reference to FIG. 6, similarly a pulley 41 is mounted on an output shaft of the SM2. A rotary rod 62 is similarly mounted in a transmission casing 61 and provided with a pulley 42 so that a timing belt TB4 is extended around this pulley 42 and the motor shaft pulley 41 so as to drive the rod 62 for rotation.

The rod 62 is mounted with a further pulley 43 below the above pulley 42 and a still further pulley 44 below the further pulley 43. A timing belt TB5 is similarly extended around the further pulley 43 and the pulleys 28, 28 of the second screw rods 21, 21 shown above in FIG. 2 via a guide roller GR3 for rotating these hollow screw rods. A timing belt TB6 is similarly extended around the still further pulley 44 and the pulleys 28, 28 of the two second screw rods 21, 21 shown below in FIG. 2 via a guide roller GR4 for rotating these hollow screw rods.

Thus, when the servomotors SM1, SM2 are energized to rotate respectively in one direction, the lower mold 14 and the upper mold 27 are respectively moved toward each other for engagement, while when rotating in the other direction the both molds 14, 27 are moved for disengagement so as to take out the formed product and supply forming material.

In FIG. 6, the rotary rod 62 is similarly connected at the lower end portion with the free wheeling clutch CL2. The clutch CL1 referred to above and this clutch CL2 are normally held "ON", where the rod 52 (62) is rotated in the direction shown by an arrow as shown in FIG. 8 by means of the servomotor SM1 (SM2) for bringing the both molds to be engaged with each other without no connection to the clutch CL1 and then by means of a piston/cylinder PC (FIG. 7) in stead of the servomotor now disenergized for giving additionally increased mold clamping force according to the mechanism to be explained hereafter, respectively through pulley/belt transmission mechanism.

Thereafter the clutch CL1 (CL2) is turned "OFF". When the formed product has been taken out of the molds and a new material has been supplied, the molds start to move toward each other and the clutch CL1 (CL2) is turned again "ON" in reply to the corresponding signal.

Figure 8:
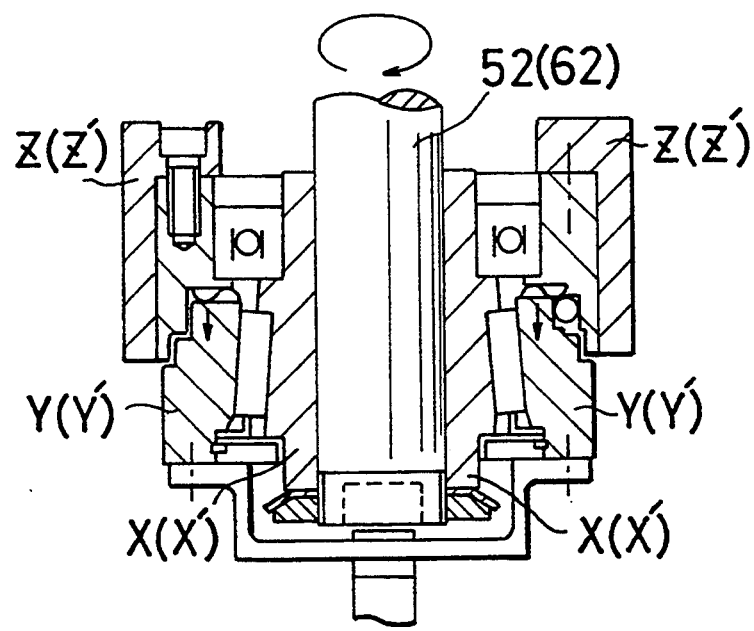
FIG. 8 is a sectional view of the clutch shown in an "ON" state.
Figure 9:
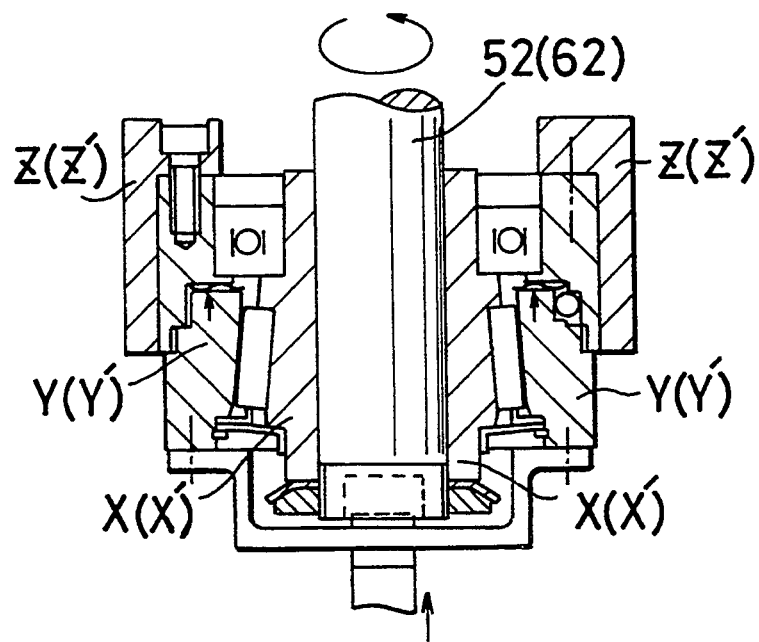
FIG. 9 is a similar view of the above in an "OFF" state.

A typical free wheeling clutch to be used therefor is well known to those skilled in the art, but will be illustrated by way of precaution in FIG. 8 (ON) and FIG. 9 (OFF), which comprises a hollow inner member X (X'), in which the rotary rod 52 (62) is inserted at the lower portion thereof and keyed therebetween (not shown), and an outer member Y (Y') as well as a plurality of rolls arranged in an angular gap formed between the outer peripherall wall of the former member and the inner peripheral wall of the latter member slanted (not shown) also in a plane transverse to the drawing plane (FIGS. 8 and 9) so that even if the rotary rod 52 (62) and consequently the inner member X (X') keyed thereto are rotated in the direction shown by an arrow in FIG. 8, and even if the clutch CL1 (CL2) is in "ON" state, the outer member Y can not be rotated, but when the clutch member Y (Y') is rotated, the clutch member X (X') can be rotated in the illustrated direction (FIG. 8) because the clutch CL1 (CL2) is in "ON" state.

Furthermore, a clutch box member Z (Z') is mounted on the other member Y (Y') so that even if the latter is rotated the former can not be rotated, but when the former is rotated the latter can be rotated so as to drive the inner member X (X') and consequently the rotary rod 52 (62) for rotation in the direction shown in FIG. 8 owing to a ball/notch or ball/wedged guide groove arranged between the clutch box member Z (Z') and the outer member Y (Y').

When air or oil is supplied via cylinder under pressure so as to raise up the outer member Y (Y'), the clutch CL1 (CL2) is turned "OFF" so that even if the rod 52 (62) and consequently the inner member X (X') is rotated in the other direction as shown by an arrow in FIG. 9, the outer member Y (Y') and consequently the clutch box member Z (Z') can not be rotated, during which the molds are moved apart from each other.

Figure 7:
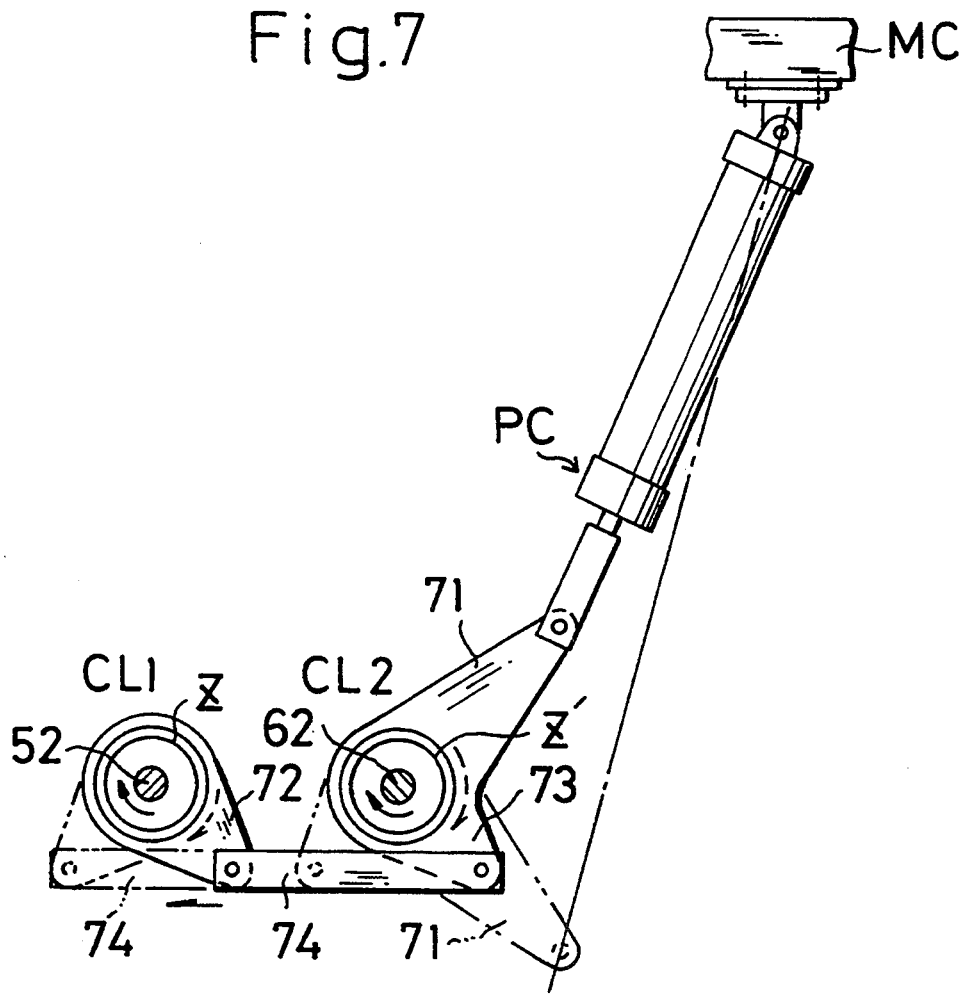
FIG. 7 is a side elevation of a piston-cylinder mechanism for giving additionally increasing mold clamping force as well as two free wheeling clutches.

Now in reference to FIG. 7, a free end of the cylinder PC is pivotaly engaged with the machine casing MC so as to swing from the illustrated position to a position shown by a phantom line, while a free end of the piston PC is pivotally connected with an arm lever 71 at the free end thereof which is fixed on the clutch box z'.

The clutch CL1 (CL2) is fixedly mounted at the clutch box z (z') with an arm lever 72 (73), a free end of which is pivotally connected with an interconnecting rod 74 so that when the piston/cylinder device PC is actuated and the arm lever 71 is angularly moved to a position shown by phantom lines owing to the protruded pistion, the clutch box z' and consequently the rod 62 are respectively rotated in the same direction shown by arrows in a solid line and a phantom line. Due to interconnecting rod 74, the clutch box z and consequently the rod 52 are also rotated so as to give additionally increased mold clamping force through the pulley-belt transmitting mechanism.

According to the arrangement referred to above, it is possible to give additionally increased mold clamping force not only during which the servomotors SM1, SM2 are stopped, but also during which the servomotor are still energized so that the rotary force is added.

Figure 10:
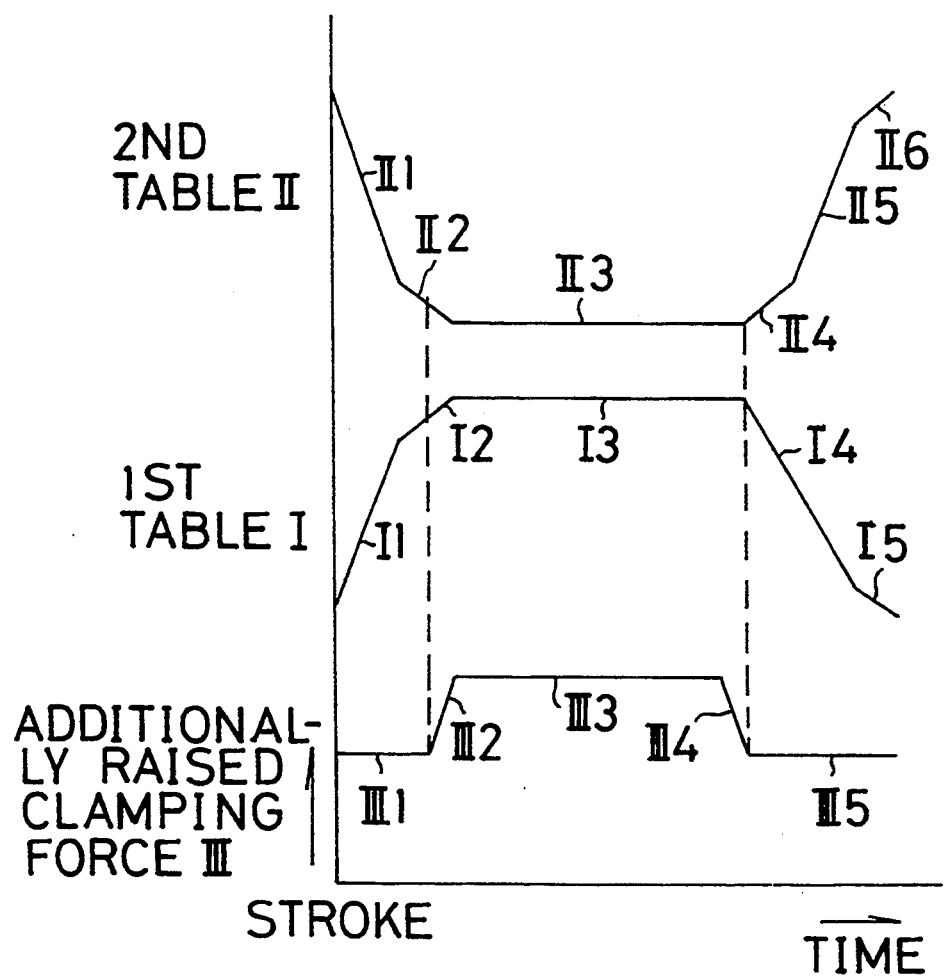
FIG. 10 is a graph showing synchronizedly overlapping of first and second mold tables moving toward each other according to the respective servomotors, with additionally increasing mold clamping force according to the piston-cylinder mechanism.

In FIG. 10, I and II show respectively movement lines of the first table carrying the lower mold 14 and the second table carrying the upper mold 27. The movement line I consists of a rapid rise section I1, a slow rise section I2, a contact section I3, a rapid descent section I4 and a slow descent section I5, while the movement line II consists of a rapid descent section II1, a slow descent section II2, a contact section II3, a slow rise section II4, a rapid rise section II5 and slow rise section II6. The line III shows movement of the piston PC, which consists of a standstill section III1, a rapid exercise section of additional clamping force III2, a lock section III3, a rapid removal section of the lock and the additional clamping force III4 and a standstill section III5. As shown by two phantom lines, particularly the left, the piston/cylinder device PC has been actuated to start movement according to a program in the computer, when the upper and lower molds are moving toward each other. It is possible, thus, for the mold clamping apparatus according to the invention to far sooner exert additional clamping force and make one cycle time shorter than the prior art where the same and one piston/cylinder device is used for giving the additionally raised clamping force in addition to moving the molds toward and apart with each other.

Figure 12:
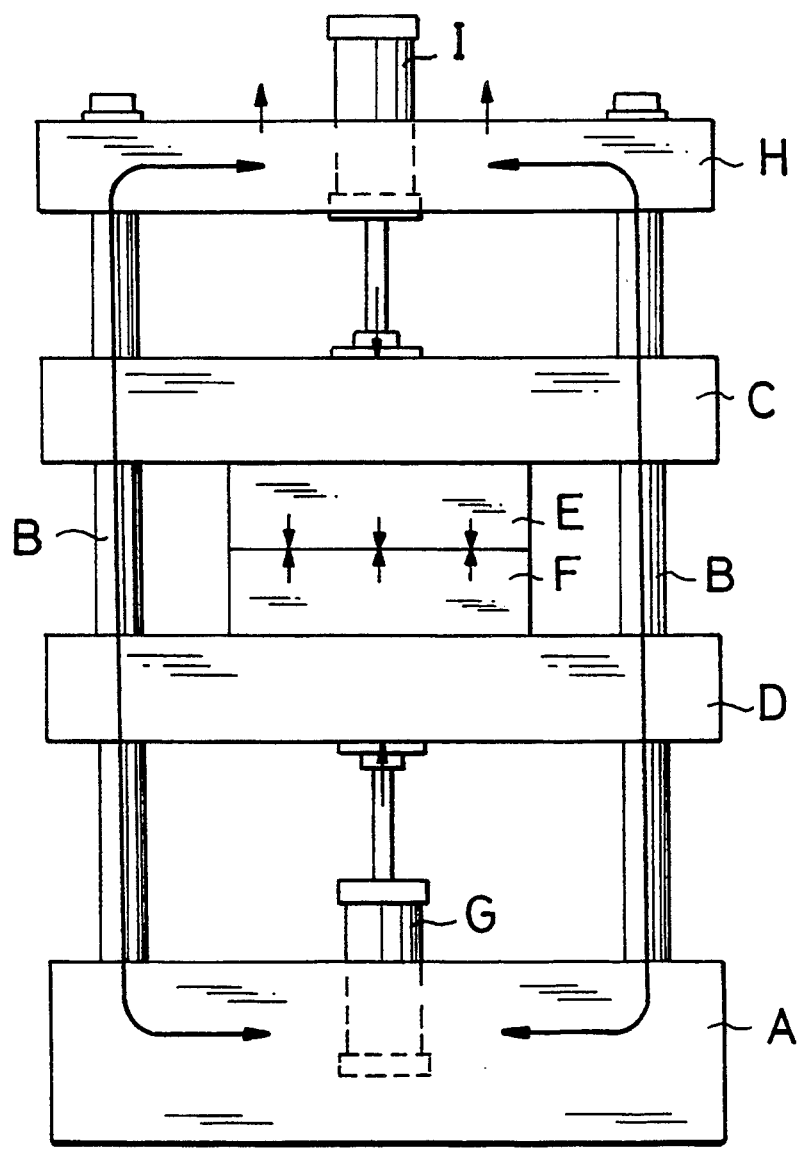
FIG. 12 is a similar view of a typical mold clamping apparatus according to the prior art.

As referred to at the beginning, the mold clamping apparatus (FIG. 12) comprises a base bed A supporting four posts B along which two tables C, D respectively carrying molds E, F may slidingly move up and down. Between the base bed A and the table D, there is mounted a piston/cylinder device G for moving the table D up or down. Similarly between a crown member H and the table C, the other piston/cylinder device I is mounted for the similar purpose.

The both piston/cylinder devices are generally of a few to several tons of power and such mold clamping force is transmitted as shown by arrows so that the bed A, the posts B, tables C, D and the crown member H must be made of a material having very high stiffness and rigidity.

Figure 11:
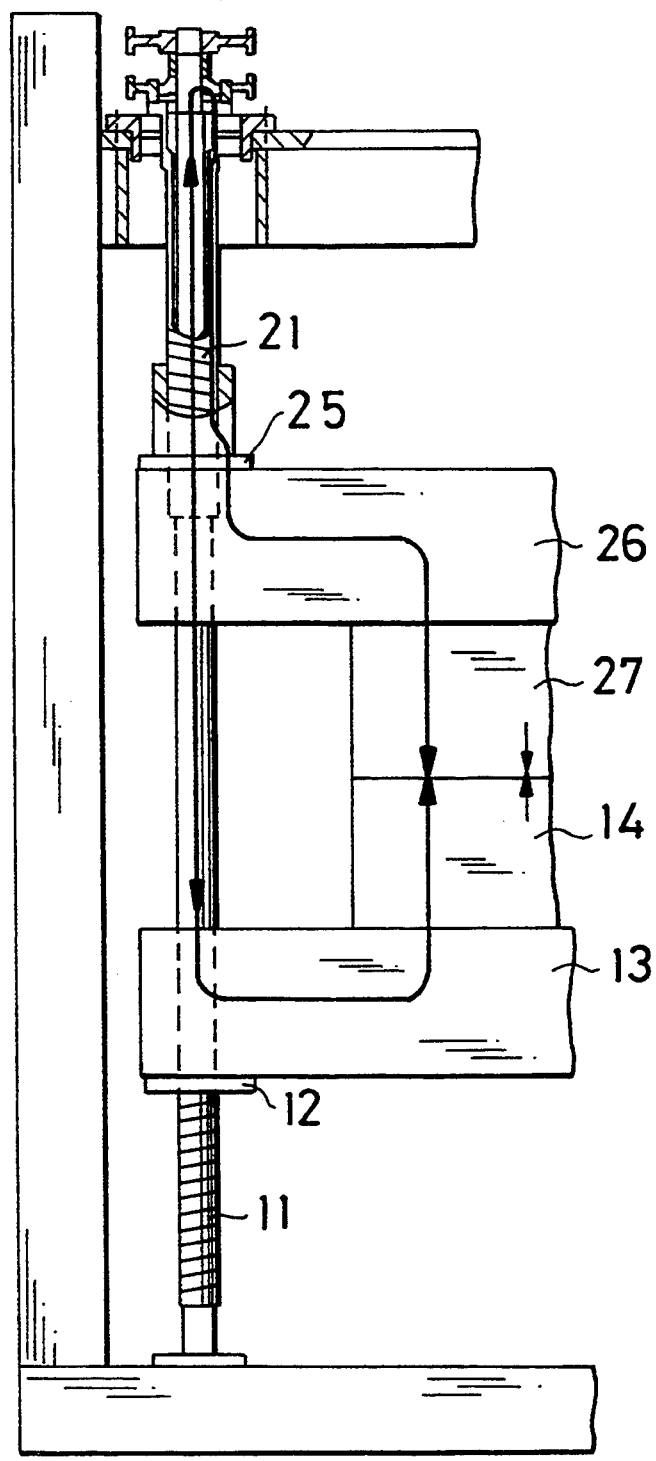
FIG. 11 is a diagram showing how to transmit the force for mold clampimg between the first and second mold tables.

According to the apparatus of the invention, owing to use of a plurality of pairs of screw rods and nut members for carrying the molds as shown in FIG. 11, it is possible to use a relatively small power prime mover e.g. a servomotor and members of not so strong material in view of power transmission shown by arrows. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is;

1. A mold clamping apparatus comprising:
   a pair of reversible prime movers,
   a plurality of screw rod pairs, each of which includes a first screw rod having an unthreaded extension and a hollow second screw rod embracing the unthreaded extension therein so as to freely rotate relative to the first screw rod,
   a pair of means for transmitting rotary forces from the pair of prime movers respectively to the first screw rods and to the hollow second screw rods,
   a plurality of nut member pairs, each of which consists of a first nut member and a second nut member respectively threadedly engaged with the first and second screw rods so as to move up or down when the screw rods are rotated in a first or a second direction,
   first and second molds respectively connected to the first and second nut members so as to move toward or apart from each other, and
   means for giving a mold clamping force to the engaged two molds when said prime movers are stopped.

2. The mold clamping apparatus as claimed in claim 1, characterized in that four screw rod pairs are arranged at four corners of machine casing, that each of the first screw rods is supported for rotation at a lower end thereof on a base bed as a part of said machine casing and has an upper unthreaded extension, and that the hollow second screw rods embrace the upper unthreaded extensions therein and are held at upper end for rotation by the machine casing.

3. The mold clamping apparatus as set forth in claim 1, characterized in that each of said prime movers is a servomotor and said means for giving mold clamping force include two piston-cylinder devices which are connected between said first and second molds and a machine casing.

4. The mold clamping apparatus as set forth in claim 1, characterized in that said means for transmitting rotary force from the pair of prime movers comprises a plurality of belt pulleys connected to said prime movers and said screw rod pairs, and timing belts each extended around two or more of said pulleys.

5. The mold clamping apparatus as set forth in claim 4, characterized in that an output shaft of each of the prime movers is mounted with one of said belt pulleys, that a pair of rotary rods are held for rotation in a pair of cylindrical casings disposed on a machine casing, each said rotary rod being provided with a pulley so that one of said timing belts is extended around said output shaft pulley and the rotary rod pulley for rotating the rotary rod, that each rotary rod is provided with a further pulley so that a second endless timing belt is extended around this further pulley and two pulleys respectively mounted on two of said plurality of screw rod pairs via at least one guide roller and that each rotary rod is provided with a still further pulley so that a third endless timing belt is extended around this still further pulley and other pulleys respectively mounted on two other of said plurality of screw rods via at least one guide roller.

6. The mold clamping apparatus as set forth in claim 5, characterized in that there are provided a pair of free wheeling clutches, each of which is mounted at a bottom of one of said cylindrical casings and comprises a hollow inner conical member in which one of said rotary rods is fixedly inserted at a lower portion thereof; an outer conical member surrounds a first portion of the inner conical member between which a plurality of rolls are arranged and a clutch box surrounding a second portion of the inner conical member between which a bearing is arranged for allowing the relative rotation thereof, said clutch box is disposed on the outer conical member between which spring means for urging the outer conical member down so as to keep the clutch in an "ON" state, a ball/wedged groove is arranged so that even if the rotary rod and consequently the inner conical member are rotated in one direction the outer conical member is not rotated, but when the clutch box is rotated the outer conical member and the inner conical member can be rotated so as to rotate the rotary rod in said one direction; that when the rotary rod is rotated in an opposite direction for moving the molds apart from each other the clutch is turned "OFF" by introducing fluid under pressure so as to raise up the outer member against the force of the spring means; and that the pair of clutches are interconnected by a link mechanism so that when a piston cylinder is actuated the clutch box is rotated through an arm lever fixed thereon at one end and pivotally connected with a piston free end at a second end and consequently the rotary rod is rotated in said one direction for giving a clamping force through the pulley belts and screw rod pairs to the engaged molds.

* * * * *